L. P. WHITING.
Improvement in Lathe-Dogs.

No. 132,882.

Patented Nov. 5, 1872.

Witnesses:
A. W. Almqvist
C. Skogwist

Inventor:
L. P. Whiting
per ——
Attorneys.

UNITED STATES PATENT OFFICE.

LORENZO P. WHITING, OF POUGHKEEPSIE, NEW YORK.

IMPROVEMENT IN LATHE-DOGS.

Specification forming part of Letters Patent No. 132,882, dated November 5, 1872.

*To all whom it may concern:*

Be it known that I, LORENZO P. WHITING, of Poughkeepsie, in the county of Dutchess and State of New York, have invented a new and useful Improvement in Adjustable Dog for Lathes, of which the following is a specification:

The object of this invention is to provide convenient means for holding bolts which it is necessary to turn, as in steam-engine work, locomotives, and other nice pieces of machinery; and it consists in an adjustable dog attached to the face-plate of a lathe constructed as hereinafter described.

Figure 1:
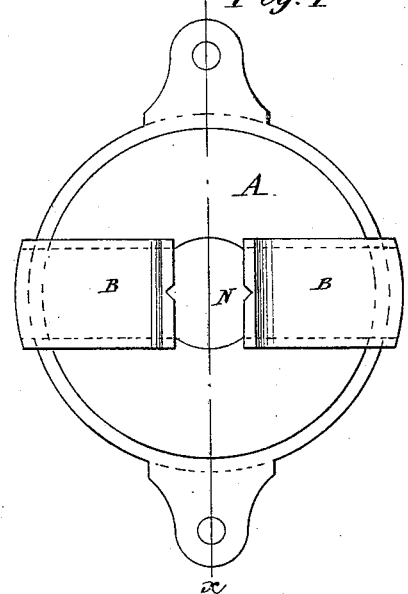
Figure 2:
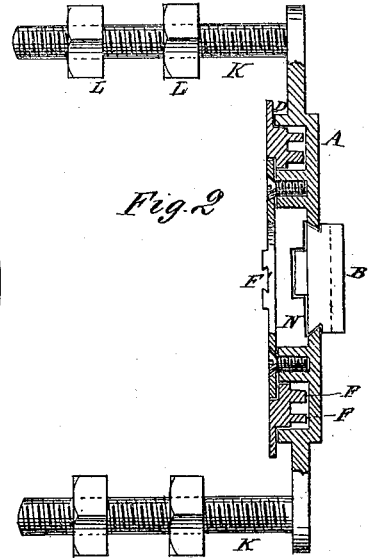
Figure 3:
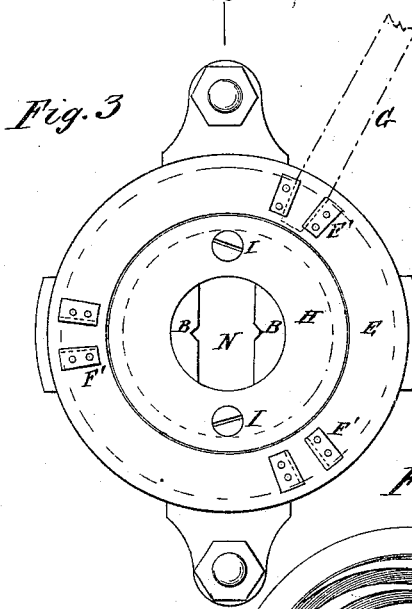
Figure 4:
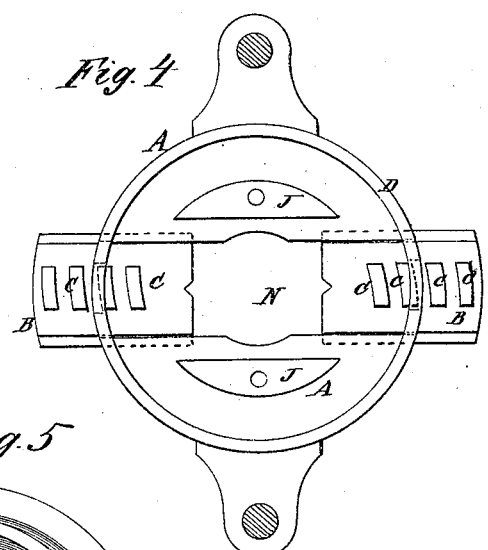
Figure 5:
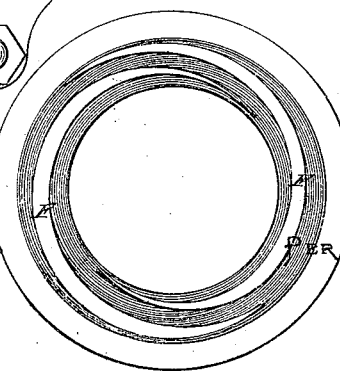

In the accompanying drawing, Figure 1 is a front or face view; Fig. 2 is a cross-section through the line $x\ x$ of Fig. 1; Fig. 3 is a view of the inner or face-plate side; Fig. 4 is a view of the inner side with the scroll-plate and center plate removed; and Fig. 5 is a view of the reverse or inner side of the scroll-plate.

Similar letters of reference indicate corresponding parts.

A is a plate into which the jaws B B are dovetailed, as represented in Figs. 1 and 2, so that they will slide toward and from the center. On the inner sides of these jaws are cogs C. The plate A is provided with a flange, D, which confines the scroll-plate E. F F represent a double scroll, or two circular ribs, on this plate which engage with the cogs of the jaws when the scroll-plate is placed within the flange of the plate A, as seen in Fig. 2. On the outer side of the scroll-plate are three (more or less) pairs of lever-cleats, F', and G is a lever by means of which the scroll-plate is revolved. The scrolls or ribs F F are arranged on the plate so that they act like screw-threads on the cogs, and move the jaws out and in, as may be desired. They act upon the jaws in a manner similar to the continuous scroll or volute of the well-known lathe-chuck; but in my adjustable dog each jaw is acted upon by a separate rib or scroll, and the ribs are placed at an angle which moves the jaws very quickly and saves time. The scroll-plate is held to its place by the center plate H, which is fastened to the stationary plate A by the screws I I, bedded on the projecting lugs J J. The scroll-plate is rabbeted for the center-plate, as seen in Fig. 2. K K are screws rigidly attached to the plate A, by means of which the dog is attached to the face-plate of the lathe. L L are screw-nuts, by means of which the dog is adjusted to any distance from the face or side of the face-plate, according to the length of the center in the lathe-spindle. N is an orifice through the plate A, through which the center passes, and is allowed to come in contact with the bolt-head with the point or center of the lathe. The old lathe-"chuck" is not adapted for this kind of work, and is far more intricate and expensive. It must be screwed onto the lathe-spindle in the place of the face-plate; besides, the jaws or dogs of the chuck being arranged for centering and boring without any center-point, it is not well adapted to the purpose for which my adjustable dog is intended. For holding these bolts the old-fashioned lathe-dogs consume too much time in adjusting them; besides, for bolts with thin heads, and for all bolts which (like engine-bolts) have to be turned entirely up to the head, the common dog is nearly useless. With my adjustable dog this description of work can be done at a great saving of time and trouble.

Although I design this adjustable dog for turning bolts principally, I do not confine myself exclusively to that particular use, as it may be profitably used for other purposes. It should be borne in mind that this adjustable dog is simply to hold the bolt or other article on the center, and to turn it with the lathe, and not to true the article like the lathe-chuck.

Having thus described my invention, I claim as new and desire to secure by Letters Patent—

An adjustable lathe-dog, consisting of the stationary plate A, the scroll-plate E, center plate H, jaws B B, adjusting-screws K K, and nuts L L, arranged substantially as and for the purposes described.

LORENZO P. WHITING.

Witnesses:
E. A. RICHARDS, M. D.,
E. O. WHITMAN.